June 1, 1948.  L. LEE, 2D  2,442,463
FUEL SUPPLY SYSTEMS FOR INTERNAL-COMBUSTION ENGINES
Filed April 26, 1945  2 Sheets-Sheet 1

INVENTOR.
*Leighton Lee II*
BY
*Lester V. Clark*
AGENT

June 1, 1948. L. LEE, 2D 2,442,463
FUEL SUPPLY SYSTEMS FOR INTERNAL-COMBUSTION ENGINES
Filed April 26, 1945 2 Sheets-Sheet 2

INVENTOR.
Leighton Lee II
BY
Lester W Clark
AGENT

Patented June 1, 1948

2,442,463

UNITED STATES PATENT OFFICE 2,442,463

FUEL SUPPLY SYSTEM FOR INTERNAL-COMBUSTION ENGINES

Leighton Lee, II, West Hartford, Conn., assignor, by mesne assignments, to Niles-Bement-Pond Company, West Hartford, Conn., a corporation of New Jersey Application April 26, 1945, Serial No. 590,378

14 Claims. (Cl. 123—119)

The present invention relates to fuel supply systems for internal combustion engines, and particularly to systems of the type in which the fuel is injected directly into the cylinders of the engine.

It has been proposed to measure the rate of flow of combustion air to an engine and to control the delivery of a direct injection pump mechanism in accordance with that rate of flow, so as to maintain a substantially constant fuel-to-air ratio. It has also been proposed to measure the fuel flow and to control the delivery of the injector pump mechanism in accordance with the balance between the air and fuel flows in order to maintain a substantially constant fuel-to-air ratio.

It is a object of the present invention to provide an improved arrangement for measuring the air and fuel flows and balancing them against each other to control the delivery of the injector pump mechanism.

Another object of the present invention is to provide improved means for controlling the delivery of the fuel injection pump mechanism under idling conditions.

Another object of the present invention is to provide improved mechanism for moving the injector pump controlling mechanism to a cut-off position when it is desired to stop the engine.

A further object of the invention is to provide improved means for positioning the injector pump delivery control mechanism for starting purposes.

A further object of the invention is to provide improved means for compensating the action of the injector pump control mechanism for variations in air density.

Figure 1:
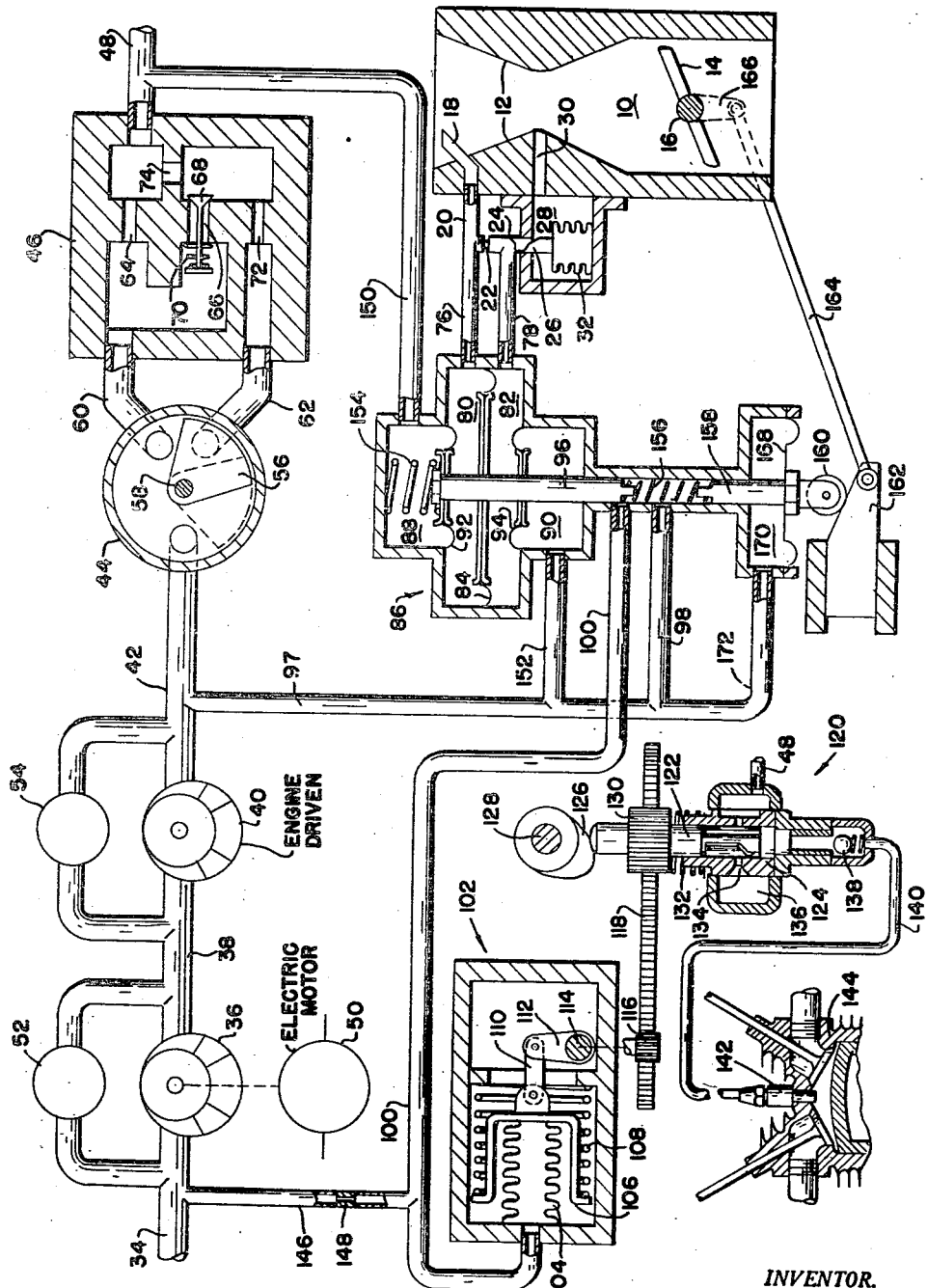
Figure 2:
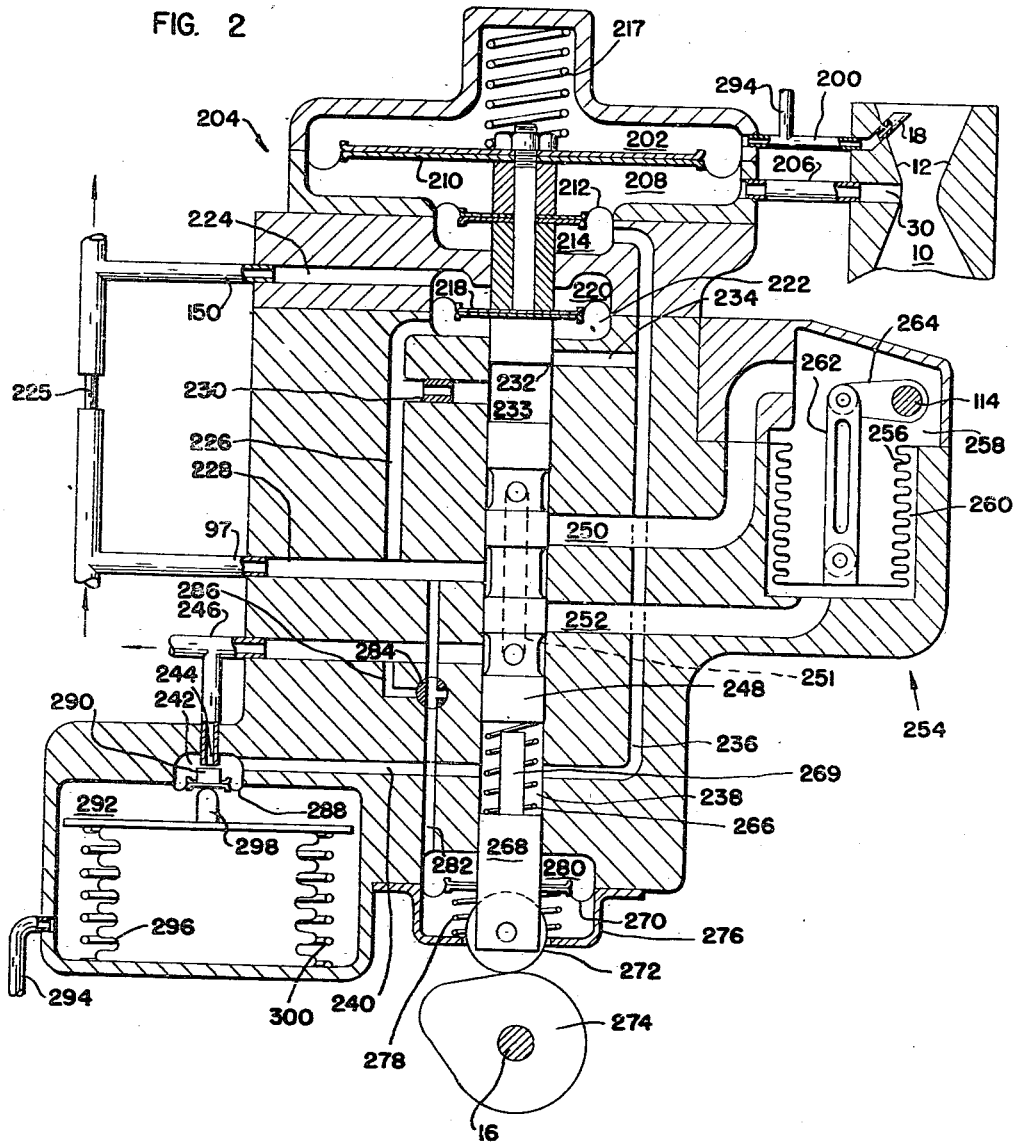

Other objects and advantages of the present invention will become apparent from a consideration of the appended specification, claims and drawing, in which Figure 1 illustrates, somewhat diagrammatically, a fuel supply system for an internal combustion engine built in accordance with the principles of my invention, and Figure 2 illustrates a modified form of control mechanism which may be used in place of that shown in Figure 1.

Figure 1

There is shown in Figure 1 a passage 10 for air flowing to an integral combustion engine. This passage 10 includes a Venturi portion 12 which produces a differential pressure varying with the square of the velocity of the air flowing thru the passage. The flow of air thru the passage 10 is controlled by a throttle 14 fixed on a shaft 16 for rotation therewith.

The pressure differential set up by the venturi 12 produces a flow of air thru a secondary air passage extending from an impact tube 18 thru a conduit 20, a restriction 22, a conduit 24, past a valve 26 into a chamber 28 and thence thru a conduit 30 to the throat of venturi 12.

The pressure differential between the ends of the secondary air passage may be divided into two component drops, one appearing across the restriction 22 and the other across the valve 26. The valve 26 is operated by a bellows 32 located in the chamber 28. The bellows 32 is preferably filled with a fluid having a suitable coefficient of thermal expansion, so that the valve 26 is moved in accordance with changes in the pressure and temperature of the air in the chamber 28. The pressure differential appearing across restriction 22 is thereby controlled both as a function of the velocity and the density of the flowing air so that that pressure differential is a measure of the mass of air flowing thru the passage 10 per unit time.

The fuel flowing to the engine comes from a tank (not shown) and passes thru a conduit 34, a boost pump 36, a conduit 38, a pump 40, a conduit 42, a mixture control 44, a jet system generally indicated at 46, and a conduit 48 to the injector pumps, one of which is shown at 120.

The pump 36 is driven by an electric motor indicated schematically at 50. The discharge pressure of pump 36 is controlled by a pressure relief valve 52.

Pump 40 is preferably driven by the engine and its discharge pressure is controlled by a pressure relief valve 54.

The mixture control 44 includes a disc valve 56 fixed on a shaft 58. The disc valve 56 controls the flow of fuel thru a pair of conduits 60 and 62 which connect the mixture control 44 to the jet system 46. When the valve 56 is in the position shown in full lines in the drawing, the mixture control is said to be in its "lean" position, since the fuel can then flow to the jet system only thru the conduit 60. When the valve 56 is in the position illustrated in dotted lines in the drawing, the mixture control is said to be in its "rich" position, since the fuel can flow thru both conduits 60 and 62 to the jet system 46. It may be seen that the valve 56 can be moved to a position wherein it cuts off the flow of fuel thru both the conduits 60 and 62. The mixture control is then said to be in its "cut-off" position.

When the mixture control is in its lean position, fuel can flow to the engine only thru a fixed jet or orifice 64 and a parallel jet 66 controlled by a valve 68 biased closed by a spring 70. When the mixture control is in its rich position, fuel can also flow thru a fixed jet 72. The flow thru the jets 66 and 72 also passes thru another fixed jet 74.

The function of the jet system is to control the fuel flow as a function of the pressure differential across the jet system. When the mixture control is in its lean position, a given pressure differential produces a certain rate of fuel flow. When the mixture control is in its rich position, the cross-sectional area open to the fuel flow is increased so that the same pressure differential as before produces an increased fuel flow. Since the pressure differential across the jet system is controlled by the air flow, as hereinafter explained, it may be seen that the mixture control may be used to select different fuel to air ratios for different flight conditions. The jet 66 and the valve 68 controlling it are provided to increase the fuel flow whenever the pressure differential across the jets exceeds a predetermined value, thereby producing an increase in the fuel-to-air ratio at high power outputs of the engine.

The pressure differential appearing across the restriction 22 is applied thru a pair of conduits 76 and 78 to chambers 80 and 82, respectively, located on opposite sides of a diaphragm 84 in a fuel meter generally indicated at 86. The fuel meter 86 also includes chambers 88 and 90. Chamber 88 is separated from the chamber 80 by a diaphragm 92 and chamber 90 is separated from the chamber 82 by a diaphragm 94.

The diaphragms 92, 84 and 94 are attached to a valve 96, which controls the flow of fuel from a conduit 98 thru a conduit 100 to a servomotor generally indicated at 102.

The servomotor 102 includes an expansible bellows 104, whose free end is attached to a yoke 106. A spring 108 biases the yoke 106 in a direction to contract the bellows. The yoke 106 is connected to a link 110, and the link 110 is in turn connected to an arm 112 attached to a shaft 114. The shaft 114 carries a pinion 116 which cooperates with a rack 118.

The position of rack 118 determines the delivery per stroke of each of a plurality of injector pumps, corresponding in number to the number of cylinders in the engine, only one of which is shown in the drawing, at 120. The pump 120 includes a plunger 122 reciprocated in a cylinder 124 by means of a cam 126 fixed on a shaft 128 which may be the cam shaft of the engine. A pinion 130 is attached to the plunger 122 and cooperates with rack 118, so that the plunger 122 is rotated by movement of rack 118. A spring 132 holds the end of the plunger 122 against the cam 126. The plunger 122 is provided with a contoured recess, so that as it is rotated, the quantity of fuel delivered at each stroke is varied. The pressure ahead of the plunger of the pump is relieved and pumping is terminated whenever the contoured recess comes opposite the fuel inlet port 134. By rotating the plunger, the point in the plunger travel at which the pressure is relieved and pumping is terminated, may be varied. The fuel inlet port 134 is supplied with fuel from the conduit 48 thru a chamber 136.

The plunger 122 delivers fuel thru a check valve 138 and a conduit 140 to a nozzle 142 located in a cylinder 144 of the engine.

The interior of bellows 104 of the servomotor 102 is supplied with fuel thru the conduit 100, as previously described. Fuel is discharged from the bellows 104 thru a conduit 146, having a restriction 148 therein. The conduit 146 leads to the fuel inlet conduit 34.

The fuel supplied to the servomotor comes from the discharge side of pump 40 at a relatively high pressure thru conduits 97 and 98 and the variable restriction formed by the valve 96. It may be seen that the pressure in bellows 104 is determined by the relative rates of flow of fuel thru valve 96 and thru restriction 148. If the fuel enters the bellows 104 thru valve 96 at the same rate as it leaves thru restriction 148, then the volume of fuel in bellows 104 remains constant and the position of the injector pump control rack 118 remains constant. If the fuel enters the bellows 104 thru valve 96 faster than it can be discharged thru restriction 148, then the bellows 104 expands, causing a clockwise rotation of shaft 114, and moving rack 118 to the left, in a fuel flow decreasing direction. If the valve 96 closes so far that fuel is discharged thru restriction 148 faster than it enters the bellows 104 thru the valve 96, then the bellows 104 contracts, moving the shaft 114 counterclockwise and operating the rack 118 to the right, in a fuel flow increasing direction.

The chamber 88 of pressure meter 86 is connected by means of a conduit 150 to the fuel conduit 48 on the downstream side of the jet system 46. The chamber 90 of the pressure meter 86 is connected by means of a conduit 152 and conduit 97 to the conduit 42 in the fuel line on the upstream side of the jet system 46.

The fuel pressure differential across the jet system, which is a measure of the rate of flow of fuel to the engine, is applied to the chambers 88 and 90, with the high pressure in the chamber 90, so that this fuel pressure differential acts upwardly on valve 96. The air pressure differential established across restriction 22, which is a measure of the rate of flow of air to the engine, is applied to the diaphragm 84 so as to act in a downward direction on valve 96.

A spring 154 acts downwardly on diaphragm 92 and biases the valve in a closing direction. Another spring 156 acts upwardly on the valve 96. The spring 156 is retained between the lower face of valve 96 and the upper face of a retainer 158. The retainer 158 carries a roller follower 160 which cooperates with a cam 162 connected by a link 164 to an arm 166 on the throttle shaft 16. It may, therefore, be seen that the position of throttle 14 determines the position of cam 162 and hence the biasing force of spring 156.

Cam 162 is preferably contoured so that the upward force of spring 156 is decreased as the throttle approaches closed position, thereby allowing valve 96 to close under the influence of spring 154 and increasing the delivery of the injector pump mechanism.

The retainer 158 is attached to a diaphragm 168 forming a movable wall of a chamber 170. The chamber 170 is connected thru a conduit 172 to the conduit 97. When the engine is running, the fuel supplied under pressure to chamber 170 causes the follower 160 to be maintained in contact with cam 162. This permits the use of lighter springs 154 and 156 than would be allowable if those springs were required to hold the cam.

It may be seen that, under starting conditions, the throttle 14 is moved to open position, and the cam 162 then operates follower 160 to set a predetermined value for the force of spring 156. At this time, the air and fuel pressure differentials acting on valve 96 are rather small, so that the pressure supplied to the servomotor 102 from the electric motor driven boost pump 36 and hence the capacity of the pump 120 under starting conditions can be accurately controlled by proper design of springs 154 and 156 and cam 162.

*Figure 2*

There is illustrated in Figure 2 a modified form of fuel flow control mechanism which may be used in place of that illustrated in Figure 1. In this figure, parts which are the same as corresponding parts in Figure 1 have been given the same reference characters.

In Figure 2, the impact tube 18 is connected thru a conduit 200 to an expansible chamber 202 in a fuel meter 204. The throat of venturi 12 is connected thru a conduit 206 to another expansible chamber 208 in the fuel meter 204. The chambers 202 and 208 are separated by a flexible diaphragm 210. Another flexible diaphragm 212 separates chamber 208 from another chamber 214. The diaphragms 210 and 212 are attached at their centers to a valve 216. Another diaphragm 218 is attached at its center to the valve 216 and separates a pair of expansible chambers 220 and 222. The chamber 220 is connected thru a passage 224 to a conduit 150, which is the same as conduit 150 of Figure 1. The chamber 222 is connected thru passages 226 and 228 to a conduit 97, which is the same as conduit 97 of Figure 1.

The valve 216 controls the flow of fuel thru a passage which extends from conduit 97, thru passages 228 and 226, a restriction 230, a chamber 233, a port 232 controlled by valve 216, a passage 234, a passage 236, a chamber 238, a passage 240, an expansible chamber 242, a port 244, and a drain conduit 246. The passage 236 is connected to the chamber 214.

A piston valve 248 is balanced between the fuel pressure in the chamber 233 and the fuel pressure in chamber 238. The valve 248 controls the flow of fuel thru ports leading thru passages 250 and 252 to a fluid servomotor 254. The servomotor 254 includes a flexible bellows 256 which separates chambers 258 and 260. The chamber 258 is connected to passage 250 and the chamber 260 is connected to passage 252. The free end of bellows 256 is connected to a link 262 whose opposite end is attached to an arm 264 fixed on a shaft 114, which is the same as shaft 114 of Figure 1.

A spring 266 acts upwardly on the bottom of valve 248. The position of the lower end of spring 266, and hence the force which it applies to valve 248, is varied by means of a movable retainer 268. The retainer 268 is attached to a diaphragm 270 and carries at its lower end a roller 272 which cooperates with a cam 274 mounted on throttle shaft 16. A cap 276 retains a spring 278 between itself and the diaphragm 270, and thereby biases the diaphragm 270 and retainer 268 for movement away from the cam. The diaphragm 270 forms a wall of an expansible chamber 280 which is connected thru a passage 282 and a valve 284 to the passage 228.

The valve 284 is connected to the mixture control shaft 58 of Figure 1 so as to be moved thru an angle of 90 degrees clockwise from the position illustrated when the mixture control shaft is moved to its cut-off position. The valve 284 thereby connects the passage 282 thru a passage 286 to the drain passage 246.

The chamber 242 is enclosed on one side by a diaphragm 288. At its center, the diaphragm 288 carries a valve 290 which cooperates with the port 244. The diaphragm 288 separates chamber 242 from a chamber 292, which is connected thru a conduit 294 and the conduit 200 to the impact tube 18. A flexible bellows 296 is mounted within the chamber 292, and carries at its free end a button 298 which engages the center of diaphragm 288. A spring 300 biases the free end of bellows 296 upwardly.

The bellows 296 may be evacuated, so that it compensates for variations in air pressure at the entrance to the passage 10. However, if desired, it may be filled with a fluid having an appreciable coefficient of thermal expansion, so that it also compensates for temperature changes.

*Operation of Figure 2*

The fuel controlling mechanism just described operates the shaft 114 and thereby the injector pump delivery controlling mechanism to maintain a substantially constant fuel-to-air ratio. More specifically, it operates to maintain the fuel pressure differential across the jet system, which is applied to diaphragm 218, substantially proportional to the air pressure differential established by the venturi 12, which latter pressure differential is applied to diaphragm 210. The action of this mechanism is compensated for variations in air density by the pressure in chamber 214 which acts upwardly on diaphragm 212, and is controlled by the density responsive valve 290.

Under steady air and fuel flow conditions, the air pressure differential acting downwardly on diaphragm 210 is balanced by the fuel pressure differential acting upwardly on diaphragm 218. If the air flow increases, the air pressure differential is increased, thereby moving the valve 216 downwardly so as to close the port 232. This increases the pressure in chamber 233 on the upper end of piston valve 248. The valve 248 therefore moves downwardly, allowing fuel at high pressure to flow from conduit 228 past valve 248 thru conduit 252 to the chamber 260 underneath the bellows 256. At the same time, the chamber 258 above bellows 256 is connected thru conduit 250 and a drilled passage 251 in the valve 248 to drain conduit 246. The pressure differential acting on bellows 256 collapses the bellows, thereby moving the shaft 114 in a clockwise direction. This is the proper direction to increase the delivery of the injection pumps. The movement of shaft 114 continues until the fuel flow through restriction 225 has increased sufficiently so that the fuel pressure differential across it balances the increased air pressures differential. This restriction 225 is shown for convenience as a single fixed restriction, but it should be understood that it corresponds to the mixture control 44 and the jet system 46 of Figure 1.

If the air flow decreases the valve 216 moves upwardly, opening port 232 and decreasing the pressure in chamber 233. Valve 248 thereupon moves upwardly, allowing fuel to flow at high pressure from conduit 228 past valve 248, thru conduit 250 to chamber 258. At the same time, chamber 260 is connected thru conduit 252, past valve 248 to drain conduit 246. This causes the rotation of shaft 114 counterclockwise, in the pump delivery decreasing direction, until the decrease in the fuel pressure differential causes restoration of the pressure in chamber 233 to its previous value, thereby restoring valve 248 to its neutral position.

If the density of the air flowing thru the main air passage 10 decreases, then the bellows 296 expands, thereby moving the valve 290 toward closed position and increasing the pressure in chamber 238. There results an unbalance of pressures acting on valve 248, which moves it in an upward direction, thereby causing the servo-motor bellows 256 to rotate the shaft 114 counterclockwise, or in a fuel flow decreasing direction. This action continues until the fuel pressure differential across restriction 225 decreases sufficiently to cause valve 216 to move downward to a new position at which the pressure in chamber 233 is increased to balance the increased pressure in chamber 238.

It may therefore be seen that a decrease in air density, which indicates a decrease in the mass of air flowing per unit time, for a given air pressure differential, increases the force acting upwardly on the bottom of valve 216, so that the system reacts to reduce the fuel pressure differential, and hence the fuel flow. In this way, the fuel flow is substantially proportioned to the mass of air flowing per unit time, regardless of variations in air density.

The cam 274 maintains the position of the lower end of spring 266 constant as long as the throttle is out of the idle range. As the throttle approaches closed position, however, the cam 274 pushes the follower 272 upwardly, thereby moving the spring 266 upwardly and moving the valve 248 upwardly, or in a direction to cause counterclockwise movement of shaft 114. This increases the setting of the injector pump delivery control mechanism, and thereby increases the fuel flow to provide a richer mixture for the engine.

When the mixture control is moved to the cut-off position, the valve 284 is moved to vent the chamber 280 to the drain conduit 246. Thereupon, the pressure in chamber 280 is no longer effective to hold roller 272 against cam 274. The spring 278 thereupon moves retainer 268 upwardly, and the projection 269 on retainer 268 positively moves the valve 248 to a position which insures that the servomotor 254 will operate the fuel injector pump control mechanism in a fuel flow increasing direction. Therefore, when starting the engine, the injector pump mechanism will normally be in its maximum delivery position, which aids considerably in producing quick starting of that engine.

While I have shown and described certain preferred embodiments of my invention, other modifications thereof will readily occur to those skilled in the art, and I therefore intend that my invention shall be limited only by the appended claims.

I claim:

1. A fuel supply system for an internal combustion engine, comprising a conduit for combustion air flowing to said engine, a throttle for controlling the air flow thru said conduit, means associated with said conduit for producing two unequal pressures whose difference is a measure of the rate of flow of air thru said conduit, a conduit for fuel flowing to said engine, means for controlling the flow of fuel thru said fuel conduit, means responsive to the difference of said two unequal pressures for actuating said fuel flow control means in a direction to increase the flow of fuel upon an increase in said difference, so as to maintain a substantially constant fuel-to-air ratio, spring means acting on said fuel flow control means, and cam means connected to said throttle to move concurrently therewith for varying the loading of said spring means in a fuel flow increasing sense as said throttle approaches closed position, so as to cause an increase in the fuel-to-air ratio.

2. A fuel supply system for an internal combustion engine, comprising a conduit for combustion air flowing to said engine, a throttle for controlling the air flow thru said conduit, means associated with said conduit for producing two unequal pressures whose difference is a measure of the rate of flow of air thru said conduit, a plurality of fuel injector pumps for supplying fuel to the cylinders of said engine, means for controlling the delivery of said pumps, means responsive to the difference of said two unequal pressures for actuating said delivery varying means in a direction to increase the delivery upon an increase in said difference, so as to maintain a substantially constant fuel-to-air ratio, spring means acting on said fuel flow control means, and cam means connected to said throttle to move concurrently therewith for varying the loading of said spring means in a delivery increasing sense as said throttle approaches closed position, so as to cause an increase in the fuel-to-air ratio.

3. A fuel supply system for an internal combustion engine, comprising a conduit for combustion air flowing to said engine, a throttle for controlling the air flow thru said conduit, means associated with said conduit for producing two unequal pressures whose difference is a measure of the rate of flow of air thru said conduit, a conduit for fuel flowing to said engine, means for controlling the flow of fuel thru said fuel conduit, means responsive to the difference of said two unequal pressures for actuating said fuel flow control means in a direction to increase the flow of fuel upon an increase in said difference, so as to maintain a substantially constant fuel-to-air ratio, spring means acting on said fuel flow control means, a retainer for said spring means, a follower connected to said retainer and movable to vary the loading of said spring means, cam means connected to said throttle to move concurrently therewith for positioning said follower so as to vary the loading of said spring means in a fuel flow increasing sense as said throttle approaches closed position so as to cause an increase in the fuel-to-air ratio, an expansible chamber having a movable wall connected to said follower, and means for supplying said chamber with fuel under pressure from said fuel conduit, said wall being effective to maintain said follower in engagement with said cam means as long as the pressure in said chamber is maintained.

4. A fuel supply system for an internal combustion engine, comprising a conduit for combustion air flowing to said engine, a throttle for controlling the air flow thru said conduit, means associated with said conduit for producing two unequal pressures whose difference is a measure of the rate of flow of air thru said conduit, a plurality of fuel injector pumps for supplying fuel to the cylinders of said engine, means for simultaneously varying the delivery of said pumps, spring means biasing said delivery varying means for movement in the direction of maximum delivery, fluid motor means opposing said spring means, conduit means for supplying fuel under pressure to said motor means, valve means in said conduit means for varying the pressure of the fuel supplied to said motor means, said spring means being effective upon failure of said fuel pressure to move said delivery varying means to maximum delivery position, means responsive to the difference of said two unequal pressures for actuating said valve means to control said delivery varying means so as to maintain a substantially constant fuel-to-air ratio, second spring means acting on said valve means in opposition to said pressure difference, a retainer for said second spring means, a follower connected to said retainer and movable to vary the loading of said second spring means, cam means connected to said throttle to move concurrently therewith for positioning said follower so as to vary the loading of said second spring means in a fuel flow increasing sense as said throttle approaches closed position so as to cause an increase in the fuel-to-air ratio, an expansible chamber having a movable wall connected to said follower, and means for supplying said chamber with fuel under pressure from said fuel conduit, said wall being effective to maintain said follower in engagement with said cam means as long as the pressure in said chamber is maintained.

5. In a fuel supply system for an internal combustion engine, an air conduit, a fuel conduit, means responsive to the rate of flow of air thru said air conduit for controlling the rate of flow of fuel thru said fuel conduit to maintain a substantially constant fuel-to-air ratio, means for operating said flow controlling means including an expansible chamber, means for supplying fuel under pressure to said chamber, means including a variable restriction for discharging fuel from said chamber, and means responsive to the density of the air in said air conduit for varying said restriction.

6. A fuel supply system for an internal combustion engine, comprising a conduit for combustion air flowing to said engine, a throttle for controlling the air flow thru said conduit, means associated with said conduit for producing two unequal pressures whose difference is a measure of the rate of flow of air thru said conduit, a conduit for fuel flowing to said engine, means for controlling the flow of fuel thru said fuel conduit, means responsive to the difference of said two unequal pressures for actuating said fuel flow control means in a direction to increase the flow of fuel upon an increase in said difference, so as to maintain a substantially constant fuel-to-air ratio, first spring means acting on said fuel flow control means in opposition to said pressure difference, second spring means opposing said first spring means, and cam means connected to said throttle so as to move concurrently therewith for decreasing the loading of said first spring means as said throttle approaches closed position so as to cause an increase in the fuel-to-air ratio, said first and second spring means cooperating with said cam means to determine the fuel-to-air ratio under idling conditions.

7. In a fuel supply system for an internal combustion engine, a conduit for combustion air flowing to said engine, means associated with said conduit for producing two unequel air pressures whose difference is a measure of the velocity of air flow therethru, a fuel conduit, a metering restriction in said fuel conduit for regulating the fuel flow therethru in accordance with the fuel pressure differential thereacross, means for varying said fuel pressure differential, and means for operating said fuel pressure differential varying means in response to the difference of said two unequal air pressures and to said fuel pressure differential, said operating means including an expansible chamber, means for supplying fuel under pressure to said chamber, means including a variable restriction for discharging fuel from said chamber, and means responsive to the density of the air in said air conduit for varying said restriction.

8. A fuel supply system for a multiple cylinder internal combustion engine, comprising a conduit for combustion air flowing to said engine, means associated with said conduit for producing two unequal air pressures whose difference is a measure of the velocity of air flow therethru, a fuel conduit, a metering restriction in said fuel conduit for regulating the fuel flow therethru in accordance with the fuel pressure differential thereacross, a plurality of injector pumps for delivering fuel to the cylinders of said engine, said pumps receiving fuel from said fuel conduit, means for varying the delivery of said pumps and thereby the fuel pressure differential, a fluid motor for driving said delivery varying means, a piston valve for controlling said fluid motor, means for applying fuel under pressure to one end of said piston valve, means for controlling the pressure applied to said one end in response to the difference of said air pressures and said fuel pressure differential, means for applying fuel under pressure to the other end of said piston valve, and means for controlling the pressure of the fuel applied to said other end in accordance with the density of the air in said air conduit.

9. A fuel supply system for an internal combustion engine, comprising a conduit for combustion air flowing to said engine, a throttle for controlling the air flow thru said conduit, means associated with said conduit for producing two unequal pressures whose difference is a measure of the rate of flow of air thru said conduit, a conduit for fuel flowing to said engine, means for controlling the flow of fuel thru said fuel conduit, means responsive to the difference of said two unequal pressures for actuating said fuel flow control means in a direction to increase the flow of fuel upon an increase in said difference, so as to maintain a substantially constant fuel-to-air ratio, first spring means acting on said fuel flow control means in opposition to said pressure difference, second spring means opposing said first spring means, and cam means connected to said throttle so as to move concurrently therewith for varying the loading of at least one of said spring means, said first and second spring means cooperating with said cam means to move said flow control means to maximum flow position when said throttle is moved to open position under engine starting conditions.

10. A fuel supply system for a multiple cylinder internal combustion engine, comprising a conduit for combustion air flowing to said engine, means associated with said conduit for producing two unequal air pressures whose difference is a measure of the velocity of air flow therethru, a fuel conduit, a metering restriction in said fuel conduit for regulating the fuel flow therethru in accordance with the fuel pressure differential thereacross, a plurality of injector pumps for delivering fuel to the cylinders of said engine, said pumps receiving fuel from said fuel conduit, means for varying the delivery of said pumps and thereby the fuel pressure differential, a fluid motor for driving said delivery varying means, a piston valve for controlling said fluid motor, means for applying fuel under pressure to one end of said piston valve, means for controlling the pressure applied to said one end in response to the difference of said air pressures and said fuel pressure differential, and spring means acting on the other end of said piston valve in opposition to the pressure applied to said one end.

11. A fuel supply system for a multiple cylinder internal combustion engine, comprising a conduit for combustion air flowing to said engine, means associated with said conduit for producing two unequal air pressures whose difference is a measure of the velocity of air flow therethru, a fuel conduit, a metering restriction in said fuel conduit for regulating the fuel flow therethru in accordance with the fuel pressure differential thereacross, a plurality of injector pumps for delivering fuel to the cylinders of said engine, said pumps receiving fuel from said fuel conduit, means for varying the delivery of said pumps and thereby the fuel pressure differential, a fluid motor for driving said delivery varying means, a piston valve for controlling said fluid motor, means for applying fuel under pressure to one end of said piston valve, means for controlling the pressure applied to said one end in response to the difference of said air pressures and said fuel pressure differential, means for applying fuel under pressure to the other end of said piston valve, means for controlling the pressure of the fuel applied to said other end in accordance with the density of the air in said conduit, and spring means acting on said other end in opposition to the pressure applied to said one end.

12. A fuel supply system for a multiple cylinder internal combustion engine, comprising a conduit for combustion air flowing to said engine, means associated with said conduit for producing two unequal air pressures whose difference is a measure of the velocity of air flow therethru, a fuel conduit, a metering restriction in said fuel conduit for regulating the fuel flow therethru in accordance with the fuel pressure differential thereacross, a plurality of injector pumps for delivering fuel to the cylinders of said engine, said pumps receiving fuel from said fuel conduit, means for varying the delivery of said pumps and thereby the fuel pressure differential, a fluid motor for driving said delivery varying means, a piston valve for controlling said fluid motor, means for applying fuel under pressure to one end of said piston valve, means for controlling the pressure applied to said one end in response to the difference of said air pressures and said fuel pressure differential, spring means acting on the other end of said piston valve in opposition to the pressure applied to said one end, and throttle operated cam means for varying the loading of said spring means.

13. A fuel supply system for an internal combustion engine, comprising a conduit for combustion air flowing to said engine, a throttle for controlling the air flow thru said conduit, means associated with said conduit for producing two unequal pressures whose difference is a measure of the rate of flow of air thru said conduit, a conduit for fuel flowing to said engine, means for controlling the flow of fuel thru said fuel conduit, means responsive to the difference of said two unequal pressures for actuating said fuel flow control means in a direction to increase the flow of fuel upon an increase in said difference, so as to maintain a substantially constant fuel-to-air ratio, spring means acting on said fuel flow control means, a retainer for said spring means, a follower connected to said retainer and movable to vary the loading of said spring means, cam means connected to said throttle to move concurrently therewith for positioning said follower so as to vary the loading of said spring means in a fuel flow increasing sense as said throttle approaches closed position so as to cause an increase in the fuel-to-air ratio, an expansible chamber having a movable wall connected to said follower, and means for supplying said chamber with fuel under pressure from said fuel conduit, said wall being effective to maintain said follower in engagement with said cam means as long as the pressure in said chamber is maintained, and second spring means acting on said wall in opposition to the pressure in said chamber, said second spring means being effective upon a decrease in pressure in said chamber to cause movement of said fuel flow control means to minimum flow position.

14. A fuel supply system for an internal combustion engine, comprising a conduit for combustion air flowing to said engine, a throttle for controlling the air flow thru said conduit, means associated with said conduit for producing two unequal pressures whose difference is a measure of the rate of flow of air thru said conduit, a conduit for fuel flowing to said engine, means for controlling the flow of fuel thru said fuel conduit, means responsive to the difference of said two unequal pressures for actuating said fuel flow control means in a direction to increase the flow of fuel upon an increase in said difference, so as to maintain a substantially constant fuel-to-air ratio, spring means acting on said fuel flow control means, a retainer for said spring means, a follower connected to said retainer and movable to vary the loading of said spring means, cam means connected to said throttle to move concurrently therewith for positioning said follower so as to vary the loading of said spring means in a fuel flow increasing sense as said throttle approaches closed position so as to cause an increase in the fuel-to-air ratio, an expansible chamber having a movable wall connected to said follower, valve means for selectively supplying fuel under pressure from said fuel conduit to said chamber or connecting said chamber to a drain, said wall being effective to maintain said follower in engagement with said cam means as long as the pressure in said chamber is maintained, and second spring means acting on said wall in opposition to the pressure in said chamber, said second spring means being effective upon a decrease in pressure in said chamber to cause movement of said fuel flow control means to minimum flow position.

LEIGHTON LEE, II.

REFERENCES CITED

The following references are of record in the file of this patent:

UNITED STATES PATENTS

| Number | Name | Date |
| --- | --- | --- |
| 2,223,381 | Mock | Dec. 3, 1940 |
| 2,224,472 | Chandler | Dec. 10, 1940 |
| 2,281,411 | Campbell | Apr. 28, 1942 |
| 2,348,008 | Hunt | May 2, 1944 |
| 2,361,227 | Mock | Oct. 24, 1944 |
| 2,361,228 | Mock | Oct. 24, 1944 |
| 2,372,306 | Adair | Mar. 27, 1945 |
| 2,384,282 | Chandler | Sept. 4, 1945 |
| 2,388,669 | Baker | Nov. 13, 1945 |

FOREIGN PATENTS

| Number | Country | Date |
| --- | --- | --- |
| 523,895 | England | July 25, 1940 |
| 113,026 | Australia | May 2, 1941 |
| 553,349 | England | May 18, 1943 |